(12) United States Patent
Au et al.

(10) Patent No.: US 8,761,258 B2
(45) Date of Patent: Jun. 24, 2014

(54) ENHANCED BLOCK-BASED MOTION ESTIMATION ALGORITHMS FOR VIDEO COMPRESSION

(75) Inventors: Oscar Chi Lim Au, Kowloon (HK); Hoi Ming Wong, Kwai Chung (HK)

(73) Assignee: The Hong Kong University of Science and Technology, Hong Kong (CN)

(*) Notice: Subject to any disclaimer, the term of this patent is extended or adjusted under 35 U.S.C. 154(b) by 1950 days.

(21) Appl. No.: 11/455,009

(22) Filed: Jun. 16, 2006

(65) Prior Publication Data
US 2007/0154103 A1    Jul. 5, 2007

Related U.S. Application Data

(60) Provisional application No. 60/691,181, filed on Jun. 17, 2005.

(51) Int. Cl.
H04N 7/12    (2006.01)

(52) U.S. Cl.
USPC ..................................... 375/240.16

(58) Field of Classification Search
USPC ................. 375/240, 240.01, 240.12, 240.16, 375/240.24
See application file for complete search history.

(56) References Cited

U.S. PATENT DOCUMENTS

| | | | | |
|---|---|---|---|---|
| 7,260,148 B2 * | 8/2007 | Sohm | ........................ | 375/240.16 |
| 7,440,502 B2 * | 10/2008 | Altunbasak et al. | ...... | 375/240.24 |
| 2003/0103567 A1 * | 6/2003 | Riemens et al. | .......... | 375/240.16 |
| 2003/0156646 A1 * | 8/2003 | Hsu et al. | .................. | 375/240.16 |

OTHER PUBLICATIONS

Wong, Hoi-Ming, et al., Enhanced Predictive Motion Vector Field Adaptive Search Technique (E-PMVFAST)—Based on Future MV Prediction, ICME 2005 Conference held on Jul. 6-8, 2005, 4 pages, The Hong Kong University of Science and Technology, Hong Kong.

Wong, Hoi-Ming, Motion Estimation and Compensation for H.264 Video Coding, Aug. 2006, 89 pages, A Thesis Submitted to The Hong Kong University of Science and Technology in Partial Fulfillment of the Requirements for the Degree of Master of Philosophy in Department of Electronic and Computer Engineering, Hong Kong.

Joint Video Team of ITU-T and ISO/IEC JTC 1, "Draft ITU-T Recommendation and Final Draft International Standard of Joint Video Specification (ITU-T Rec. H.264 |ISO/IEC 14496-10 AVC)," document JVT-G050r1, May 2003.

(Continued)

*Primary Examiner* — Allen Wong
(74) *Attorney, Agent, or Firm* — Amin, Turocy & Watson, LLP (57) ABSTRACT

Method, systems and software are proposed for obtaining for blocks of a first image similar blocks of a second image (the "reference image"). The blocks of the first image are processed sequentially, for each block trying out a number of candidate locations in the second image and evaluating a cost function for each. Each candidate location in the second image is displaced by a respective motion vector from the block of the first image. In a first aspect of the invention the cost function is a function of a predicted motion vector for future blocks of the first image (i.e. blocks of the first image which have not yet been processed). In a second aspect of the invention the motion vectors are given by location values which are not all whole pixel spacings, halves of the pixel spacing, or quarters of the pixel spacing.

38 Claims, 4 Drawing Sheets

(56) References Cited

OTHER PUBLICATIONS

A.M. Tourapis, O.C. Au, and M.L. Liou, "Fast Block-matching Motion Estimation using Predictive Motion Vector Field Adaptive Search Technique (PMVFAST)," in ISO/IEC JTC1/SC29/WG11 MPEG2000/M5866, Noordwijkerhout, NL, Mar. 2000.

R. Li, B. Zeng, and M.L. Liou, "A new three-step search algorithm for block motion estimation," IEEE Trans. on Circuits and Systems for Video Technology, vol. 4, No. 4, pp. 438-442, Aug. '94.

Z.L. He and M.L. Lious, "A high performance fast search algorithm for block matching motion estimation," IEEE Trans. on Circuits and Systems for Video Technology, vol. 7, No. 5, pp. 826-828, Oct '97.

A.M. Tourapis, O.C. Au, and M.L. Liou, "Fast Motion Estimation using Circular Zonal Search," Proc. of SPIE Sym. of Visual Comm. & Image Processin, vol. 2, pp. 1496-1504, Jan. 25-27, '99.

A.M. Tourapis, O.C. Au, and M.L. Liou, G. Shen, and I. Ahmad, "Optimizing the MPEG-4 Encoder-Advanced Diamond Zonal Search," in Proc. of 2000 IEEE Inter. Sym. on Circuits and Systems, Geneva, Switzerland, May 2000.

K.K. Ma and P.I. Hosur, "Performance Report of Motion Vector Field Adaptive Search Technique (MVFAST)," in ISO/IEC JTC1/SC29/WG11 MPEG99/m5851, Noordwijkerhout, NL, Mar. 2000.

Implementation Study Group, "Experimental conditions for evaluating encoder motion estimation algorithms," in ISO/IEC JTC1/SC29/WG11 MPEG99/n3141, Hawaii, USA, Dec. '99.

"MPEG-4 Optimization Model Version 1.0," in ISO/IEC JTC1/SC29/WG11 MPEG99/n3324, Noordwijkerhout, NL, Mar. 2000.

J.R. Jain and A.K. Jain, "Displacement measurement and its application in interframe image coding," IEEE Trans. on Communications, vol. COM-29, pp. 1799-1808, Dec. '81.

\* cited by examiner

ENHANCED BLOCK-BASED MOTION ESTIMATION ALGORITHMS FOR VIDEO COMPRESSION

RELATED APPLICATION

The present application claims priority to U.S. provisional patent application 60/691,181, filed Jun. 17, 2005, the entire disclosure of which is incorporated herein by reference.

FIELD OF THE INVENTION

The present invention relates generally to methods and systems for digital signal compression, coding and representation, and more particularly to methods and systems using multi-frame motion estimation (ME). It further relates to a computer program product, such as a recording medium, carrying program instructions readable by a computing device to cause the computing device to carry out a method according to the invention.

BACKGROUND

Due to the huge size of the raw digital video data (or image sequences) used by present day multimedia applications, compression must be applied to such data so that it can be transmitted and stored. There have been many important video compression standards, including the ISO/IEC MPEG-1, MPEG-2, MPEG-4 standards and the ITU-T H.261, H.263, H.264 standards. The ISO/IEC MPEG-1/2/4 standards are used extensively by the entertainment industry to distribute movies, digital video broadcast including video compact disk or VCD (MPEG-1), digital video disk or digital versatile disk or DVD (MPEG-2), recordable DVD (MPEG-2), digital video broadcast or DVB (MPEG-2), video-on-demand or VOD (MPEG-2), high definition television or HDTV in the US (MPEG-2), etc. The MPEG-4 standard is more advanced than MPEG-2 and can achieve high quality video at lower bit rate, making it very suitable for video streaming over internet, digital wireless network (e.g. 3 G network), multimedia messaging service (MMS standard from 3 GPP), etc. MPEG-4 is accepted into the next generation high definition DVD (HD-DVD) standard and the MMS standard. The ITU-T H.261/3/4 standards are designed for low-delay video phone and video conferencing systems. The early H.261 standard was designed to operate at bit rates of p*64 kbit/s, with p=1, 2, . . . , 31. The later H.263 standard is very successful and is widely used in modern day video conferencing systems, and in video streaming in broadband and in wireless network, including the multimedia messaging service (MMS) in 2.5 G and 3 G networks and beyond. The latest standard, H.264 (also called MPEG-4 Version 10, or MPEG-4 AVC) is currently the state-of-the-art video compression standard. It is so powerful that MPEG decided to jointly develop with ITU-T in the framework of the Joint Video Team (JVT). The new standard is called H.264 in ITU-T and is called MPEG-4 Advance Video Coding (MPEG-4 AVC), or MPEG-4 Version 10. H.264 is used in the HD-DVD standard, Direct Video Broadcast (DVB) standard and probably the MMS standard. Based on H.264, a related standard called the Audio Visual Standard (AVS) is currently under development in China. AVS 1.0 is designed for high definition television (HDTV). AVS-M is designed for mobile applications. H.264 has superior objective and subjective video quality over MPEG-1/2/4 and H.261/3. The basic encoding algorithm of H.264 [1] is similar to H.263 or MPEG-4 except that integer 4=4 discrete cosine transform (DCT) is used instead of the traditional 8=8 DCT and there are additional features include intra prediction mode for I-frames, multiple block sizes and multiple reference frames for motion estimation/compensation, quarter pixel accuracy for motion estimation, in-loop deblocking filter, context adaptive binary arithmetic coding, etc.

Motion Estimation is the core part in most video compression standards such as MPEG-1/2/4 and H.261/3/4, to exploit temporal redundancy, so its performance directly affects the compression efficiency, subjective video quality and coding speed of a video coding system.

In block matching motion estimation (BMME), the most common measure of the distortion between the current block and the reference block in ME is the sum of absolute difference (SAD), for an N×N block, defined as:

$$SAD(mvx, mvy) = \sum_{m=0,n=0}^{N-1} |F_t(x+m, y+n) - F_{t-1}(x+m+mvx, y+n+mvy)|$$

where $F_t$ is the current frame, $F_{t-1}$ is the reference frame and (mvx, mvy) represents the current motion vector (MV). For a frame with width=X, height=Y, and block size=N×N, the total number of search points at which the SAD needs to be evaluated in order to find the optimum motion vector in a search range equal to ±W is:

$$\left(\frac{X}{N}\right)\left(\frac{Y}{N}\right)(2W+1)^2,$$

which is equal to 1673100 for X=352, Y=288, N=16 and W=32. This is a huge number that can consume huge computation power in a video encoder. Many fast algorithms [2]-[9] have been proposed to reduce the number of search points in ME, such as Three-Step Search (TSS) [11], 2D log Search [12], New Three-Step Search (NTSS) [3], MVFAST [7], and PMVFAST [2]. MVFAST and PMVFAST significantly outperform the first three algorithms as they perform center-biased ME using a median motion vector predictor as a search center and hence reduce the number of bits for MV encoding by smoothing the motion vector field.

Figure 1:
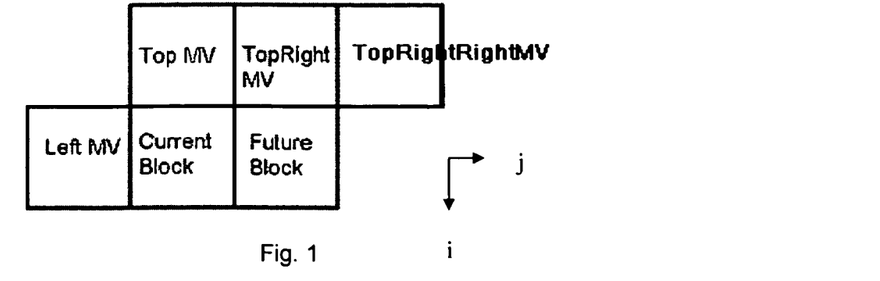
FIG. 1 illustrates the current block, the left block, the top block, the topRight block, the topRightRight block, and the right block.

The PMVFAST algorithm (which is a significant improvement on MVFAST and other fast algorithms, and thus was accepted into MPEG standard [10]) initially considers a set of MV predictors, including median, zero, left, top, top-right and previous co-located MV predictor. FIG. 1 illustrates the locations of the locations of the current block, the left block, the top block, the topRight block, the topRightRight block, and the right block (which is a "future block", i.e. a block which is processed after the current block). It computes the SAD cost for each prediction. In later developments, PMVFAST was modified to compute the RD (Rate Distortion) cost [13] instead of the SAD cost using the following cost function:

$$J(m, \lambda_{motion}) = SAD(s, c(m)) + \lambda_{motion}(R(m-p)) \quad (1)$$

where s is the original video signal and c is the reference video signal, m is the current MV, p is the median MV predictor of the current block, $\lambda_{motion}$ is a Lagrange multiplier and R(m−p) represents the bits used to encode the motion information. The next step in PMVFAST is to select the MV predictor that has minimum cost, and perform large or small diamond searches based on the value of the minimum cost obtained from the MV predictors.

A separate but important issue in defining current video coding standards, is the use of subpixel motion vectors including half-pixel, quarter-pixel or perhaps even ⅛-pixel motion vectors, which give more accurate description of motion and can give a PSNR gain of about 1 dB over integer-pixel motion estimation. With half-pixel precision, motion vectors can take on uniformly-spaced location values such as 0.0, 0.5, 1.0, 1.5, 2.0, etc. With quarter-pixel precision, motion vectors can take on location values such as 0.00, 0.25, 0.50, 0.75, 1.00, 1.25, 1.50, 1.75, 2.00, etc. With ⅛ pixel precision, motion vectors can take on location values such as 0.000, 0.125, 0.250, 0.375, 0.500, 0.625, 0.750, 0.875, 1.000, 1.125, 1.250, 1.375, 1.500, 1.625, 1.750, 1.875, 2.000, etc.

Figure 6:
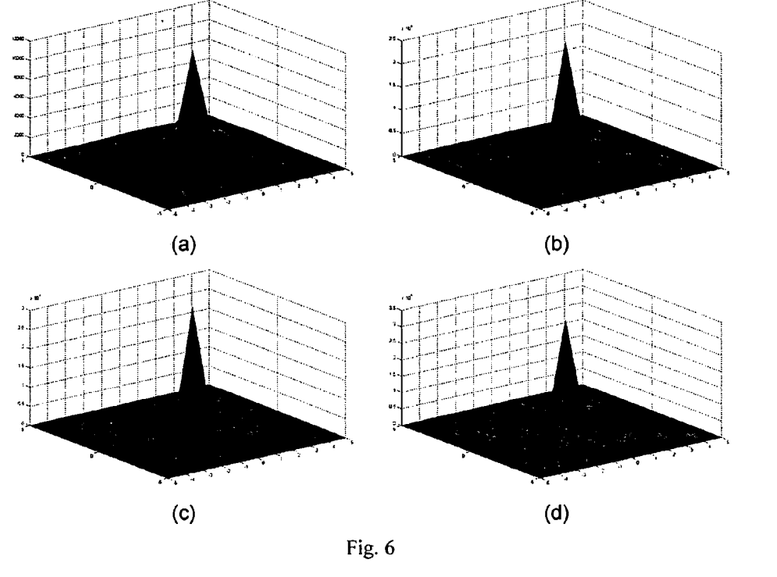
FIG. 6 shows the motion vector distribution in Foreman sequence using the Full Search (FS) algorithm for (a) (0,0) MV, (b) median MV, (c) adjacent MV in current frame and collocated MV in previous frame, (d) bottom-right MV in previous frame (PreBottomRightMV)

It is well known that motion vector distribution tends to be center-biased, which means that motion vectors tend to be very close to (0, 0). This is shown in FIG. 6 (a), which shows the motion vector distribution in Foreman sequence using the Full Search (FS) algorithm for (0,0) MV. In addition, as shown in FIG. 6(b), the motion vector distribution is also biased towards the median predictor (medianMV) which is the median of the motion vectors for the left block, top block and topright block shown in FIG. 1. In addition, the motion vector is also biased towards the adjacent motion vectors (leftMV, topMV, topRightMV) in the current frame and the collocated motion vector (preMV) in the previous frame, as shown in FIG. 6(c). It is also biased towards the bottom-right motion vector (preBottomRightMV) in the previous frame, as shown in FIG. 6(d). These can all be considered predictors for the motion vector of the current vector and they can be used in PMVFAST.

SUMMARY OF THE INVENTION

The present invention aims to provide new and useful techniques for motion estimation, suitable for use in methods and systems for digital signal compression, coding and representation In particular, the present invention seeks to provide new and useful effective and efficient motion estimation techniques, which may for example be applied in MPEG-1, MPEG-2, MPEG-4, H.261, H.263, H.264 or AVS or other related video coding standards.

A first aspect of the invention is based on the realisation that the motion estimation of the PMVFAST algorithm, although certainly an advantage over prior techniques, is not optimal. In principle, for each frame in a video, there exists a motion vector field $\{m_{i,j}, i=0 \ldots M-1, j=0 \ldots N-1\}$ that globally minimizes the total RD cost for the whole frame:

$$\text{total\_RD\_Cost} = \sum_{i=0}^{M-1}\sum_{j=0}^{N-1}[SAD(s_{i,j}, c(m_{i,j})) + \lambda_{i,j}(R(m_{i,j} - p_{i,j}))] \quad (2)$$

where (i,j) represents the (i,j)-th block in a frame which contains M×N blocks. For fixed $Q_p$ (which is a quantization parameter), $\lambda_{i,j} = \lambda =$ constant, and $$p_{i,j} = \text{median}(m_{i,j-1}, m_{i-1,j}, m_{i-1,j+1}) \quad (3)$$

However, to consider the total RD cost for the whole frame simultaneously requires an exponential order of computational complexity, which is not practical. Thus, PMVFAST and all other known algorithms consider only the RD cost for only one block at a time, instead of all the blocks in a frame.

In particular, neither MVFAST nor PMVFAST takes into account that when a motion vector is being derived in respect of a current block, this causes a change in the median MV predictor for the next block. This can affect the smoothness of the whole motion vector field.

In general terms, the first aspect of the present invention proposes a new ME algorithm by improving the cost definition of PMVFAST and the choice of motion predictor candidates. In particular, for each current block of a first image (the current block may be 16×16, 16×8, 8×16, 8×8, 4×8, 8×4, 4×4, or other rectangular size, or even non-rectangular), a similar block of a second image (the reference image) is chosen based on a cost function which includes both: (i) a term which is a dissimilarity measure (e.g. SAD, SAE) of the current block and the similar block, and (ii) a term which is a function of at least a prediction of the motion vector for a future block of the first image.

In particular, the proposed algorithm may make it possible to improve the motion field smoothness by involving the current median MV predictor, and also an estimated median MV predictor of future (i.e. as yet unprocessed) coding blocks.

Many are variations of the invention are possible. In particular, the blocks may be of any size and any shape.

There may be multiple second images (i.e. multiple references) and the search may include candidate locations in all the second images.

Furthermore, the novel cost function may be performed for a number of sub-blocks which together constitute a larger region of the first image, and which are encoded in a coding order defined by a coding number. These sub-blocks need not be of the same size or shape.

The invention has a further aspect which may be used in combination with the first aspect of the invention or separately. In general terms, the second aspect of the invention proposes that when encoding a current block of a first image (the current block may be 16×16, 16×8, 8×16, 8×8, 4×8, 8×4, 4×4, or other rectangular size, or even non-rectangular), this is done using motion vectors which are selected having location values (i.e. respective components in the two axial directions) which are selected from a set of values different from those used than in known techniques.

Consider one possible motion vector predictors: (0,0). Whereas the conventional technique of full integer pixel allows motion vectors to take on location values such as −2.0, −1.0, 0, 1.0, 2.0, etc., the second aspect of the invention proposes to modify the set of possible location values close to the predictor. For the location value of 1.0 which is nearest to 0, we can use another location value such as 0.85 such that the allowable location values would include −2.0, −0.85, 0, 0.85, 2.0, etc. The advantage of this is that statistically motion vectors tend to be close to 0. And thus by choosing the location closer to 0, we would be closer to the true motion vector and thus can give better motion compensation that can lead to higher compression efficiency.

Thus, in one specific expression of the invention, the set of possible locations values for at least one axial direction may be chosen such that they cannot all be written as Lm where m=− . . . , 2, −1, 0, 1, 2 . . . and L is a constant (e.g. 1 pixel spacing, one-half pixel spacing, or one-quarter pixel spacing); that is, the location values are non-uniform. Specifically, the set of possible location values for at least one axial direction may be chosen such that they cannot all be written as m/n where m=− . . . , 2, −1, 0, 1, 2 . . . and n is 1 or a power of 2.

Note that the second aspect of the invention is not limited to choosing location values from a set of non-uniformly spaced location values; nor is it limited to selecting only the two location values closest to zero as compared to the conventional set of location values. As an example, in another example of the second aspect of the invention the location value 2.0 can be changed to 1.9 such that the allowable location values would include −1.9, −0.85, 0, 0.85, 1.9, etc.

Thus, in an alternative specific expression of the second aspect of the invention, the set of possible location values (for at least one of the directions) is chosen to include one or more location values which can be written as $LA_m m/n$, where $m = -\ldots, 2, -1, 0, 1, 2 \ldots$, n is 1 or a power of two, L is a constant (e.g. 1 pixel spacing, one-half pixel spacing, or one-quarter pixel spacing), and $A_m$ is a value (optionally different for different values of m) which is less than 1 but which is at least 0.75, more preferably at least 0.80, and most preferably at least 0.85.

We have found that the optimal value(s) of $A_m$ depend upon the video.

One advantage of certain embodiments of the second aspect of the invention is that the motion vectors they produce can be encoded in the same format code as in conventional algorithms, except that the conventional codes for the location values should respectively be interpreted as the possible location values used by the embodiment. For example, if the location values used by a certain embodiment are: −1.9, −0.85, 0, 0.85, 1.9, etc, then the conventional code for the location value 1.0 should be interpreted as 0.85, and the conventional code for the location value 2.0 should be interpreted as 1.9, etc.

A method according to the second aspect of the invention may include the steps of defining a search region, defining within the search region a plurality of candidate locations including a set of a plurality of locations defined by the novel location values of the second aspect of the invention. These location values are the values of the corresponding displacements of the candidate locations from a key location (e.g. the (0,0) motion vector location, the predicted-motion vector, etc). For each candidate motion-vector, we calculate a cost function which is a function of a similarity measure (e.g. SAD, SAE) between the current block in the first image and the block at the said candidate motion-vector in the second image. Optionally, it may also be a function of the following motion vectors: the said candidate motion-vector, the current predicted-motion-vector, and optionally, as in the first aspect of the invention, one or more future predicted-motion-vectors. For example, optionally the cost function may be given be as in the first aspect of the invention.

BRIEF DESCRIPTION OF THE FIGURES

Embodiments of the invention will now be described for the sake of example only with reference to the following figures, in which.

DETAILED DESCRIPTION OF THE EMBODIMENTS

The first embodiment of the invention employs many features of the PMVFAST algorithm, but improves upon PMVFAST (and other existing algorithms) by considering a few neighboring blocks instead of just one block. Eqn. (2) and (3) show that the choice of the MV of the current block directly affects the RD cost of the neighboring blocks, including the right block (or the $(i, j+1)^{th}$ block), the lower-left block (or the $(i+1, j-1)^{th}$ block), and the lower block (or the $(i+1, j)^{th}$ block). This is because the current MV would affect the predicted MV of these neighboring blocks and thus in turn affect the optimal motion vectors for those blocks. These are "future" blocks as motion estimation has not been performed on them when the current block is processed. We cannot compute the optimal motion vector of these future blocks concurrently with the current block because this we would require computing the optimal motion vectors for all the blocks in the whole frame simultaneously as in Eqn. (2), which would incur excessive complexity.

Instead, to assess the implication of the choice of the current MV for the current block on the right block or the $(i, j+1)^{th}$ block, we might add to the RD cost function of the current block of Eqn. (1) a term $$R(|m_{i,j+1} - p_{i,j+1}|), \qquad (4)$$

where $m_{i,j+1}$ is the optimal motion vector of the right block based on the current MV of the current block, and $P_{i,j+1}$ is the median MV predictor for the right block based on the current MV of the current block, i.e.

$$P_{i,j+1} = \text{median}(m_{i,j}, m_{i-1,j+1}, m_{i-1,j+2}) \qquad (5)$$

However, $m_{i,j+1}$ in Eqn. (4) is unknown as the motion estimation for the right block (a future block) has not been performed yet. However, we observe that $$|m_{i,j+1} - p_{i,j+1}|$$

can be approximated well by $$|m_{i,j} - p_{i,j+1}|.$$

Let Diff be $$|m_{i,j+1} - p_{i,j+1}| - |m_{i,j} - p_{i,j+1}|.$$

Figure 2:
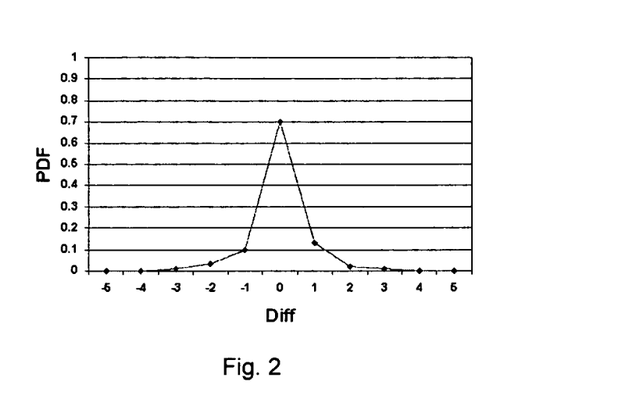
FIG. 2. shows the typical distribution of Diff which is the difference between $$|m_{i,j+1} - p_{i,j+1}| \text{ and } |m_{i,j} - p_{i,j+1}|;$$

We performed experiments on many video test sequences and studied the distribution of Diff. The typical result is heavily biased towards zero as shown in FIG. 2, which shows the probability density function (PDF) for the Foreman sequence. This implies that the two quantities are almost identical in most of the cases (identical in about 70% of the cases and differ by only 1 in about 23%). This suggests that $$|m_{i,j} - p_{i,j+1}|$$

is a good approximation of $$|m_{i,j+1} - p_{i,j+1}|.$$

As a result, $R(|m_{i,j+1}-p_{i,j+1}|)$ can be approximated by $W*R(|m_{i,j}-p_{i,j+1}|)$, where $W>0$. Likewise, we may add additional terms to the cost for the lower-left and lower blocks.

For the $(i,j)^{th}$ block, let medianMV denote the Median MV predictor given by Eqn. 3. Let FmedianMV denote the future median MV predictor (median MV predictor for the right block) given by Eqn. (5). Consequently, FmedianMV is a function of the MV candidate. The first embodiment is here referred to as the "Enhanced Predictive Motion Vector Field Adaptive Search Technique" (E-PMVFAST) for the (i,j)-th block.

Figure 7:
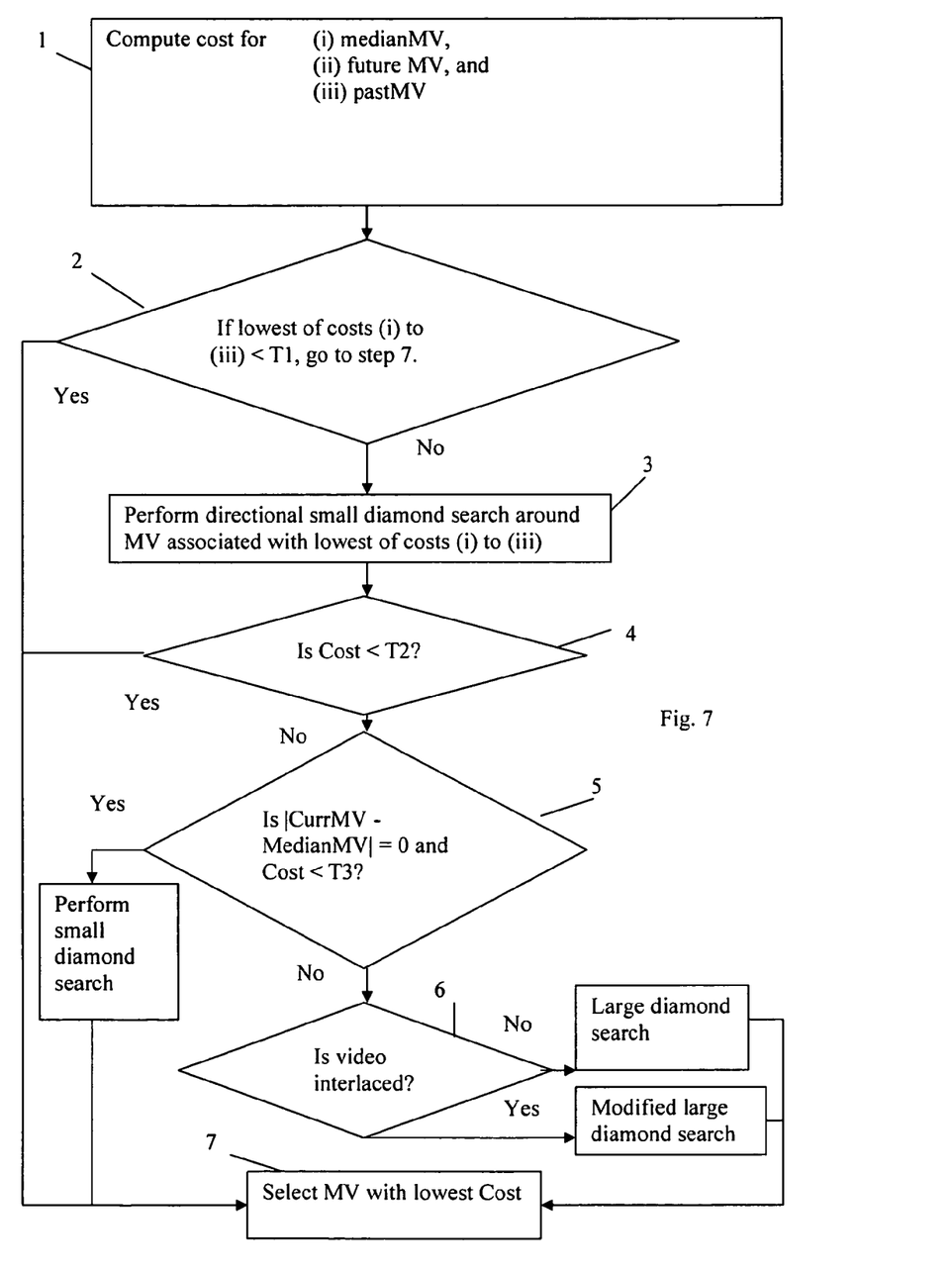
FIG. 7 is a flow diagram of the first embodiment of the invention.

The steps of the embodiment are follows. They are also shown in FIG. 7.

For any candidate MV, define Cost as follows.

$$\text{Cost(MV)}=\text{SAD}+\lambda*[w*R(\text{MV}-\text{medianMV})+(1-w)*R(\text{MV}-F\text{medianMV})] \quad (6)$$

1. Compute Cost for three motion vector predictors: (i) the median MV predictor ("medianMV"), (ii) the estimated motion vector for the right block ("futureMV") defined as futureMV=median(TopMV,TopRightMV,TopRight-RightMV)

and (iii) the MV predictor from a past block ("pastMV"), which is the one of the previous co-located MV ("PreMV") and Previous-Bottom-Right MV ("PreBottomRightMV") that is farther away from medianMV, i.e.

$$\text{pastMV}=\arg\max_{MV\in\{PreMV,PreBottomRightMV\}}\{abs(\text{MV}-\text{medianMV})\}$$

Note that item (ii) can be supplemented or replaced by an estimated motion vector for another neighbouring future block, such as the bottom-left, bottom, and/or bottom-right.

Note also that in item (iii), the Previous-Bottom-Right MV can be supplemented or replaced with by a previous MV predictor for another neighbouring block.

Note that items (ii) and (iii) form independent aspects of the invention.

If any of the above MV predictors is not available (e.g. at frame boundaries), then skip that predictor.

2. If the smallest Cost of the motion vector predictors is less than a threshold T1, then stop the search and goto step 7. Otherwise, choose the motion vector with the smallest Cost as currentMV (current MV) and goto the next step. Note that, the Cost of the 3 motion vector predictors can be computed in some predefined order (e.g. medianMV, followed by futureMV, followed by pastMV), and at any moment, if the Cost of any motion vector predictor is less than certain threshold, then the search may stop and goto step 7.

3. Perform 1 iteration of Directional Small Diamond Search around currentMV. The concept of a Directional Small Diamond Search is explained below.

4. If the smallest Cost is less than a threshold T2, stop the search and goto step 7. Otherwise, choose the motion vector with the smallest Cost as currentMV and goto the next step.

5. If (currentMV=medianMV) and the current smallest Cost is less than a threshold T3, perform Small Diamond Search and go to step 7.

Figure 3A:
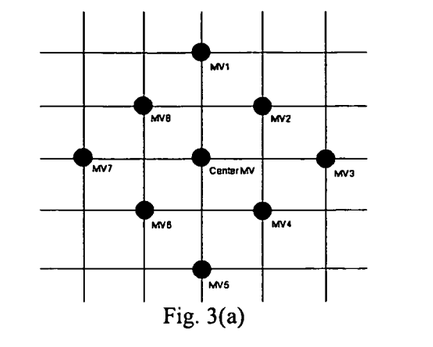
FIG. 3a shows the search pattern of large diamond search as used in a first embodiment of the invention.
Figure 3B:
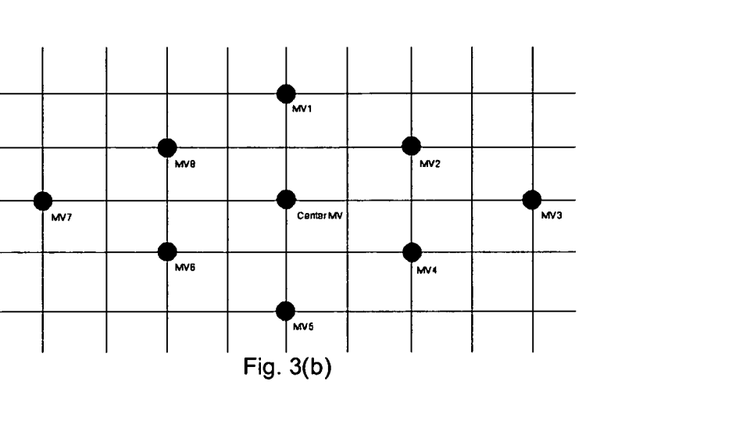
FIG. 3b shows the search pattern of the modified large diamond search as used in a first embodiment of the invention.

6. If the video is not interlaced, perform Large Diamond Search, as shown in FIG. 3(a); otherwise, perform Modified Large Diamond Search as shown in FIG. 3(b). In each of these steps the Cost function is evaluated for each of the marked points of the Diamond.

7. Select the MV with smallest Cost.

In our experiments, a value for w of about 0.8 was found to be effective.

Figure 4:
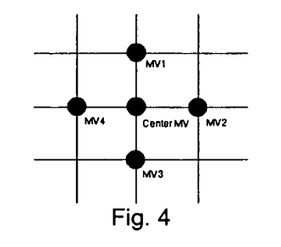
FIG. 4 shows the search pattern of small diamond search as used in the first embodiment of the invention.

The steps of the Directional Small Diamond Search are now explained. Suppose that centerMV is the current search center and MV1, MV2, MV3 and MV4 are four surrounding search points as shown in FIG. 4. Compute R(MVi−medianMV) for each MVi. If R(MVi−medianMV)<R(centerMV−medianMV), then compute the SAD and the Cost for MVi. Otherwise, ignore the MVi. Select the MV with the lowest Cost as the currentMV. Note that the concept of a directional diamond search is believed to be new, and constitutes an independent aspect of the invention, which need not be performed in combination with the concept of using a futureMV.

The steps of a Large Diamond Search and Modified Large Diamond Search are the same, but the search is done for all the set of points shown respectively in FIGS. 3(a) and 3(b).

We now consider a number of possible variations to the embodiment within the scope of the invention.

Firstly, note that the weighting factor w in the Cost function can be different for different blocks. Furthermore, optionally the w may be different for different MV candidates. In particular, the definition of w may depend on situations such as whether the MV candidate is close to the medianMV and/or the futureMV, or whether the x-component or y-component of the MV candidate is the same as the x-component or y-component of the FmedianMV.

Furthermore, the Cost function may not be restricted to the form of Eqn. (6). It can be any function which includes a distortion measurement term (e.g. SAD, sum of square distortion (SSD), mean absolute distortion (MAD), MSD, etc) and a term which takes into account the bits required to encode the motion vector of the current block and those of some neighboring blocks (e.g. the right block, the bottom block, the bottom left block, etc).

Furthermore, in step 1, the definition of futureMV is not restricted to the form given in step 1 above. Two possible alternative definitions for futureMV are:

futureMV=median(leftMV,TopRightMV,TopRight-RightMV)

futureMV=median(medianMV,TopRightMV,TopRightRightMV)

Furthermore, in step 1 as expressed above, pastMV is selected as the one out of a list collection of possible MVs (preMV and preBottomRightMV) in the previous frame which is farthest from medianMV. However, the list of MV to be considered can contain more than two possibles MV (e.g. preMV, preLeftMV, preRightMV, preTopMV, preTopLeftMV, preTopRightMV, preBottomMB, preBottomLeftMV, preBottomRightMV, etc). In addition, MV from more than one previously encoded frame can be included in the list (e.g. if current frame is frame N, the list can contain frame N-1, N-2, N-3, . . . ). If the current frame is a B-frame, the list of previously encoded frames can include future P-frames.

Furthermore, in step 1, pastMV is chosen to be the possible MV that is farthest from a reference MV (medianMV in step 1). Other reference MVs are possible, including the leftMV, or TopMV, or TopRightMV, or some combination. Other ways of choosing from the list of possible MV are also possible.

In step 2, the Cost of the 3 motion vector predictors are derived in some predefined order. Possible predefined orders include a) medianMV, followed by futureMV, followed by pastMV
b) medianMV, followed by pastMV, followed by futureMV
c) futureMV, followed by medianMV, followed by pastMV
d) futureMV, followed by pastMV, followed by medianMV
e) pastMV, followed by medianMV, followed by futureMV
f) pastMV, followed by futureMV, followed by medianMV Furthermore, while one iteration of the Directional Small Diamond Search is performed in step 3 as expressed above, more than one iteration can be applied.

Simulation Results

We now present simulation results for the embodiment E-PMVFAST. The embodiment was embedded into H.264 reference software JM9.3 [13], and simulated using various QP, video sequence, resolution, and search range. Tables 1 (a-c) and 2 (a-c) show some typical simulation results. The PSNR (peak-signal-to-noise ratio) change and BR (bit-rate) change are the changes of PSNR and bit rate with respect to full search (FS). The simulation results suggest that the bit rate and PSNR of the proposed E-PMVFAST tend to be similar to that of full search and PMVFAST but E-PMVFAST tends to be about 40% faster than PMVFAST, across a wide range of video sequences and bit rates. One important feature of E-PMVFAST is that its motion vector field tends to be very smooth, so that the motion vectors can represent the objects' movement more accurately than other fast motion estimation algorithms.

Figure 5A:
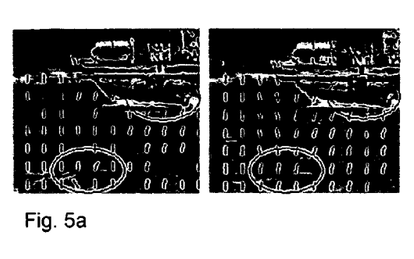
FIGS. 5a and 5b compare the smoothness of the MV field of PMVFAST and the first embodiment of the invention.
Figure 5B:
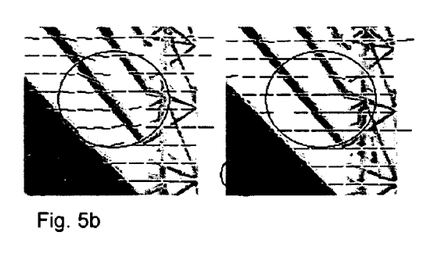

In each of FIGS. 5(a) and 5(b), the left-hand image shows (as the short lines) the motion vector fields obtained by the PMVFAST algorithm, and the right-hand image shows the motions vectors for the same image obtained by the embodiment. The motion vector field of E-PMVFAST is significantly smoother than that of PMVFAST, especially in the circled regions. The smooth motion field can be very useful for classifying the motion content of a video in perceptual trans-coding, rate control, multiple block size motion estimation, multiple reference frame motion estimation, and so on.

TABLE 1a

Simulation result for foreman CIF sequences.
Foreman CIF

| | FS | | PMVFAST | | | E-PMVFAST | | |
|---|---|---|---|---|---|---|---|---|
| QP | PSNR | BR | PSNR Change | BR Change | Speed up | PSNR Change | BR Change | Speed up |
| 24 | 38.61 | 10457168 | −0.01 | 1.12% | 269.90 | −0.01 | 0.73% | 345.62 |
| 26 | 37.25 | 7498832 | −0.02 | 1.13% | 259.61 | −0.02 | 1.17% | 337.49 |
| 28 | 35.99 | 5397584 | −0.02 | 1.53% | 250.27 | −0.03 | 1.21% | 329.79 |
| 30 | 34.64 | 3504232 | −0.02 | 1.27% | 241.91 | −0.04 | 1.20% | 326.41 |
| 32 | 33.34 | 2730064 | −0.02 | 1.19% | 235.26 | −0.03 | 1.22% | 321.96 |
| 34 | 32.25 | 2044176 | −0.05 | 1.57% | 230.48 | −0.05 | 1.38% | 325.01 |
| 36 | 31.07 | 1529648 | −0.07 | 1.20% | 226.76 | −0.09 | 1.28% | 325.47 |
| 38 | 29.9 | 1184744 | −0.05 | 1.76% | 223.29 | −0.06 | 0.99% | 328.10 |
| 40 | 28.89 | 960056 | −0.09 | 1.85% | 220.98 | −0.11 | 1.09% | 334.25 |
| 42 | 27.79 | 794312 | −0.14 | 1.71% | 218.94 | −0.16 | 1.74% | 341.62 |
| 44 | 26.7 | 672224 | −0.17 | 1.58% | 217.42 | −0.22 | 0.89% | 351.22 |
| Average | | | −0.06 | 1.45% | 235.89 | −0.07 | 1.17% | 333.36 |

TABLE 1b

Simulation result for Coastguard CFI sequences.
Coastguard CIF

| | FS | | PMVFAST | | | E-PMVFAST | | |
|---|---|---|---|---|---|---|---|---|
| QP | PSNR | BR | PSNR Change | BR Change | Speed up | PSNR Change | BR Change | Speed up |
| 24 | 37.32 | 19901336 | 0 | 0.02% | 245.39 | 0 | 0.02% | 328.81 |
| 26 | 35.77 | 15169632 | −0.01 | −0.03% | 236.12 | 0 | 0.01% | 319.07 |
| 28 | 34.35 | 11403728 | −0.01 | −0.07% | 232.24 | −0.01 | −0.03% | 308.17 |
| 30 | 32.8 | 8097840 | 0 | 0.07% | 229.89 | 0 | 0.04% | 301.18 |
| 32 | 31.34 | 5616880 | −0.01 | 0.23% | 228.38 | 0 | −0.04% | 296.55 |
| 34 | 30.08 | 3913296 | −0.01 | −0.08% | 227.20 | −0.01 | −0.23% | 294.13 |
| 36 | 28.75 | 2546328 | −0.02 | 0.03%. | 225.88 | −0.01 | −0.04%. | 292.18 |
| 38 | 27.55 | 1684056 | −0.03 | 0.48%. | 225.13 | −0.03 | 0.35%. | 293.95 |
| 40 | 26.55 | 1172448 | −0.04 | −0.01%. | 224.78 | −0.04 | 0.15%. | 299.45 |
| 42 | 25.52 | 800328 | −0.06 | 0.65% | 225.22 | −0.06 | 1.00%. | 308.85 |
| 44 | 24.54 | 572224 | −0.07 | −0.10% | 225.47 | −0.06 | 0.39% | 321.38 |
| Average | | | −0.02 | 0.11% | 229.61 | −0.02 | 0.15% | 305.79 |

TABLE 1c

Simulation result for Hall CIF sequences
Hall CIF

| | FS | | PMVFAST | | | E-PMVFAST | | |
|---|---|---|---|---|---|---|---|---|
| QP | PSNR | BR | PSNR Change | BR Change | Speed up | PSNR Change | BR Change | Speed up |
| 24 | 39.63 | 6954760 | −0.01 | 0.26% | 424.55 | −0.01 | 0.18% | 700.53 |
| 26 | 38.6 | 4539912 | −0.02 | 0.17% | 397.68 | −0.02 | 0.43% | 704.18 |
| 28 | 37.58 | 2993752 | −0.04 | 0.07% | 370.17 | −0.04 | 0.06% | 686.71 |
| 30 | 36.36 | 2021712 | −0.04 | 0.01% | 340.96 | −0.04 | 0.18% | 674.18 |
| 32 | 35.17 | 1411344 | −0.03 | −0.86% | 321.03 | −0.05 | −0.40% | 655.08 |
| 34 | 33.94 | 957600 | −0.02 | 0.40% | 301.76 | −0.02 | 0.44% | 659.53 |
| 36 | 32.68 | 677768 | −0.04 | 0.12% | 288.55 | −0.06 | −0.12% | 642.68 |
| 38 | 31.4 | 493168 | −0.05 | −0.04% | 276.97 | −0.05 | −0.38% | 641.42 |
| 40 | 30.05 | 379240 | −0.05 | −0.45% | 263.07 | 0 | −0.48% | 625.73 |
| 42 | 28.67 | 279008 | −0.03 | −0.99% | 251.93 | −0.07 | −0.84% | 624.02 |
| 44 | 27.68 | 214544 | −0.02 | −1.32% | 241.90 | −0.04 | −1.03% | 635.41 |
| | Average | | −0.02 | −0.24% | 316.23 | −0.04 | −0.18% | 659.04 |

TABLE 2a

Simulation result for foreman QCIF sequences.
Foreman OCIF

| | FS | | PMVFAST | | | E-PMVFAST | | |
|---|---|---|---|---|---|---|---|---|
| QP | PSNR | BR | PSNR Change | BR Change | Speed up | PSNR Change | BR Change | Speed up |
| 24 | 38.32 | 2816360 | 0 | 0.68% | 260.10 | −0.01 | −0.05% | 356.91 |
| 26 | 36.85 | 2122432 | −0.02 | 0.28% | 249.94 | −0.02 | −0.42% | 343.24 |
| 28 | 35.47 | 1615528 | −0.01 | 0.41% | 242.29 | −0.01 | 0.09% | 329.89 |
| 30 | 34.01 | 1213792 | −0.01 | 0.44% | 235.40 | −0.02 | 0.35% | 322.04 |
| 32 | 32.61 | 918272 | −0.04 | 0.57% | 231.38 | −0.01 | −0.13% | 316.56 |
| 34 | 31.39 | 710976 | −0.04 | 0.65% | 228.06 | −0.05 | 0.05% | 314.51 |
| 36 | 30.07 | 536152 | −0.1 | 0.85% | 225.33 | −0.07 | 0.60% | 311.05 |
| 38 | 28.81 | 416112 | −0.04 | 0.31% | 223.95 | −0.1 | −0.10% | 310.02 |
| 40 | 27.65 | 328288 | −0.08 | 0.74% | 222.89 | −0.08 | −0.30% | 311.37 |
| 42 | 26.5 | 259936 | −0.12 | −0.39% | 221.19 | −0.1 | 0.47% | 315.72 |
| 44 | 25.36 | 207344 | −0.18 | 1.43% | 218.38 | −0.25 | −0.08% | 321.03 |
| | Average | | −0.06 | 0.54% | 232.63 | −0.07 | 0.04% | 322.94 |

TABLE 2b

Simulation result for Akiyo QCIF sequences.
Akiyo OCIF

| | FS | | PMVFAST | | | E-PMVFAST | | |
|---|---|---|---|---|---|---|---|---|
| QP | PSNR | BR | PSNR Change | BR Change | Speed up | PSNR Change | BR Change | Speed up |
| 24 | 40.81 | 530832 | 0.01 | 0.01% | 483.45 | 0.01 | 0.01% | 1143.12 |
| 26 | 39.42 | 391936 | 0 | −0.38% | 428.54 | 0 | −0.38% | 1017.49 |
| 28 | 38 | 289096 | 0 | −0.09% | 389.95 | −0.01 | −0.25% | 879.72 |
| 30 | 36.57 | 208488 | −0.01 | 0.40% | 352.74 | −0.03 | 0.33% | 779.84 |
| 32 | 35.03 | 153776 | −0.04 | 0.83% | 312.72 | −0.02 | 1.01% | 699.16 |
| 34 | 33.66 | 118440 | 0.03 | −0.05% | 287.94 | 0.02 | 0.58% | 644.63 |
| 36 | 32.27 | 89056 | 0.01 | 1.11% | 270.48 | 0.03 | 0.88% | 621.79 |
| 38 | 31.09 | 70280 | −0.01 | −0.01% | 254.10 | −0.03 | −0.31% | 598.06 |
| 40 | 30.13 | 57200 | 0 | 0.92% | 245.76 | −0.06 | 1.58% | 612.01 |
| 42 | 28.77 | 47648 | −0.02 | 0.22% | 241.09 | −0.02 | 0.15% | 629.43 |
| 44 | 27.68 | 40608 | 0.02 | 0.55% | 240.05 | 0.01 | −0.91% | 669.52 |
| | Average | | 0.00 | 0.32% | 318.80 | −0.01 | 0.25% | 754.07 |

TABLE 2c

Simulation result for Coastguard QCIF sequences.

Coastguard QCIF

| | FS | | PMVFAST | | | E-PMVFAST | | |
|---|---|---|---|---|---|---|---|---|
| QP | PSNR | BR | PSNR Change | BR Change | Speed up | PSNR Change | BR Change | Speed up |
| 24 | 37 | 4456208 | 0 | 0.15% | 251.59 | 0 | 0.09% | 346.68 |
| 26 | 35.4 | 3298352 | 0 | 0.12% | 238.53 | 0 | 0.08% | 330.67 |
| 28 | 33.92 | 2386152 | −0.01 | 0.15% | 234.60 | −0.01 | 0.24% | 316.97 |
| 30 | 32.33 | 1633736 | −0.02 | 0.06% | 232.80 | 0 | 0.01% | 310.88 |
| 32 | 30.86 | 1110088 | 0 | 0.22% | 231.60 | 0 | −0.17% | 309.50 |
| 34 | 29.62 | 770656 | −0.01 | −0.38% | 230.98 | −0.01 | −0.32% | 310.31 |
| 36 | 28.3 | 511000 | −0.02 | 0.28% | 230.30 | −0.01 | 0.50% | 312.49 |
| 38 | 27.06 | 354208 | 0.02 | −0.47% | 229.61 | 0.01 | −0.57% | 314.41 |
| 40 | 26.08 | 256480 | −0.08 | −0.72% | 229.39 | −0.08 | −1.08% | 317.67 |
| 42 | 25.02 | 179528 | −0.06 | 2.16% | 228.04 | −0.07 | 0.45% | 325.54 |
| 44 | 24 | 131856 | −0.09 | −0.05% | 227.30 | −0.09 | 0.57% | 335.34 |
| | Average | | −0.02 | 0.14% | 233.16 | −0.02 | −0.02% | 320.95 |

We now turn to a second embodiment of the invention, which illustrates the second aspect of the invention.

As described above, conventional full integer pixel allows motion vectors to take on location values in each direction of −2.0, −1.0, 0, 1.0, 2.0, etc. In the second embodiment of the invention, the possible location values are selected to be close to the predictor. For the location value which is nearest to 0, we can use (instead of 1.0) another location value such as 0.85 such that the allowable location values would include −2.0, −0.85, 0, 0.85, 2.0, etc. The advantage of this is that statistically motion vectors tend to be close to 0. And thus by choosing the location closer to 0, we would be closer to the true motion vector and thus can give better motion compensation that can lead to higher compression efficiency. Similarly, the other location values can be changed. As an example, the location value of 2.0 can be changed to 1.9 such that the allowable location values would include −1.9, −0.85, 0, 0.85, 1.9, etc. The beauty of the proposed change is that the same motion vector code can be used, except that an encoded motion vector location of 1.0 should be interpreted as 0.85, and 2.0 as 1.9, etc.

Half pixel precision allows motion vector to take on location values such as 0.0, 0.5, 1.0, 1.5, 2.0, etc. We propose to modify these location values, especially those close to the predictor. For the location value of 0.5 that is very close to 0, we propose to use a different value. For example, one possibility is to use 0.4 instead of 0.5. In other words, the location values would include 0.0, 0.4, 1.0, 1.5, 2.0. Similarly, other location values can be modified. For example, the location value of 1.0 can be changed to 0.95 so that the new set of location values would include 0.0, 0.4, 0.95, 1.5, 2.0, etc. Again this can help to increase the compression efficiency. Similarly, the other location values can be modified to increase the compression efficiency. However, changing such locations can lead to significantly higher computation efficiency both at the encoder and the decoder. Usually, most of the compression efficiency gain comes from changing the location values close to the predictor.

Quarter pixel precision allows motion vector to take on location values such as 0.00, 0.25, 0.50, 0.75, 1.00, etc. We can modify the location values, especially those close to the predictor. As an example, we can modify them to be 0.00, 0.20, 0.47, 0.73, 0.99, etc.

Note that the proposed method allows us to choose an arbitrary number N of location values between each integer location values. For example, between the location values of 0 and 1, half-pixel precision uses 1 location value {0.5}, quarter-pixel precision uses 3 location values {0.25, 0.50, 0.75}, and ⅛-pixel precision uses 7 location values (0.125, 0.250, 0.375, 0.500, 0.625, 0.750, 0.875). The proposed method allows us to choose any N location values between 0 and 1. For example, we can choose N=2 values such as 0.3, and 0.6.

The proposed non-uniformed subpixel motion estimation and compensation does not need to be applied to every region of every frame. Instead, some bits can be introduced in the headers to indicate whether it is turned on or off for each region (e.g. slice) of the video frames. Other than that, it can be directly applied to the existing standards without any change in syntax because the same motion vector code can be applied.

The proposed non-uniform subpixel motion estimation and compensation was simulated using H.264 JM82 software and the results are shown in the tables above, in which QP stands for quantization parameter. The simulation used the location values ( . . . −1, −0.75, −0.5, −0.15, 0, 0.15, 0.5, 0.75, 1 . . . ), in both x and y directions. That is, only the location values at −0.25 and +0.25 were modified as compared with the standard scheme using quarter-pixel spaced location values. Apart from using the novel location values, the algorithm otherwise identical to the known H.264 standard algorithm. As indicated in the tables, the second embodiment can achieve considerable reduction in bit rate while achieving similar PSNR. No change in the syntax of H.264 is necessary.

| Sequences | | QP = 20 | | | QP = 24 | | |
|---|---|---|---|---|---|---|---|
| | | JM82 | Proposed | Difference | JM82 | Proposed | Difference |
| Akiyo | PSNR | 44.11 | 44.13 | 0.02 | 41.73 | 41.74 | 0.01 |
| | Bitrate | 3332792 | 3140080 | −5.78% | 1766112 | 1674296 | −5.20% |
| News | PSNR | 42.79 | 42.83 | 0.04 | 40.19 | 40.22 | 0.03 |
| | Bitrate | 6908656 | 6665160 | −3.52% | 4156840 | 4017968 | −3.34% |
| weather | PSNR | 43 | 43.01 | 0.01 | 39.57 | 39.58 | 0.01 |
| | Bitrate | 6929368 | 6803496 | −1.82% | 4425912 | 4351312 | −1.69% |

-continued

| | | | | | | | |
|---|---|---|---|---|---|---|---|
| Sean | PSNR | 42.65 | 42.67 | 0.02 | 39.8 | 39.83 | 0.03 |
| | Bitrate | 5009336 | 4755328 | −5.07% | 2734592 | 2585480 | −5.45% |

| | | QP = 28 | | | QP = 32 | | |
|---|---|---|---|---|---|---|---|
| Sequences | | JM82 | Proposed | Difference | JM82 | Proposed | Difference |
| Akiyo | PSNR | 39.33 | 39.34 | 0.01 | 36.66 | 36.69 | 0.03 |
| | Bitrate | 927791 | 904744 | −2.48% | 491032 | 497600 | 1.34% |
| News | PSNR | 37.6 | 37.62 | 0.02 | 34.68 | 34.68 | 0 |
| | Bitrate | 2497384 | 2441216 | −2.25% | 1476680 | 1469640 | −0.48% |
| weather | PSNR | 36.29 | 36.29 | 0 | 32.88 | 32.89 | 0.01 |
| | Bitrate | 2745184 | 2723152 | −0.80% | 1660648 | 1665368 | 0.28% |
| Sean | PSNR | 36.94 | 36.95 | 0.01 | 33.92 | 33.91 | −0.01 |
| | Bitrate | 1497232 | 1433544 | −4.25% | 793552 | 778816 | −1.86% |

Although only a few embodiments of the invention are described above, many variations are possible within the scope of the invention.

For example, the description of the invention given above is for blocks of fixed size in P-frames with one reference frame. However, this invention can be applied to blocks with multiple sub-block sizes, and the blocks need not necessarily be non-overlapping. There can be more than one reference frame, and the reference frame(s) can be any block in the past or in the future of the video sequence relative to the current frame.

For the video, one picture element (pixel) may have one or more components such as the luminance component, the red, green, blue (RGB) components, the YUV components, the YCrCb components, the infra-red components, the X-ray or other components. Each component of a picture element is a symbol that can be represented as a number, which may be a natural number, an integer, a real number or even a complex number. In the case of natural numbers, they may be 12-bit, 8-bit, or any other bit resolution. While the pixels in video are 2-dimensional samples with rectangular sampling grid and uniform sampling period, the sampling grid does not need to be rectangular and the sampling period does not need to be uniform.

INDUSTRIAL APPLICABILITY

Each embodiment of the invention is suitable for implementation by fast, low-delay and low cost software and hardware implementation of MPEG-1, MPEG-2, MPEG-4, H.261, H.263, H.264, AVS, or related video coding standards or methods, which may be modified to include it. Possible applications include digital video broadcast (terrestrial, satellite, cable), digital cameras, digital camcorders, digital video recorders, set-top boxes, personal digital assistants (PDA), multimedia-enabled cellular phones (2.5 G, 3 G, and beyond), video conferencing systems, video-on-demand systems, wireless LAN devices, bluetooth applications, web servers, video streaming server in low or high bandwidth applications, video transcoders (converter from one format to another), and other visual communication systems, etc.

REFERENCES

The disclosure of the following references is incorporated herein in its entirety:

[1] Joint Video Team of ITU-T and ISO/IEC JTC 1, "Draft ITU-T Recommendation and Final Draft International Standard of Joint Video Specification (ITU-T Rec. H.264|ISO/IEC 14496-10 AVC)," document JVT-G050r1, May 2003.

[2] A. M. Tourapis, O. C. Au, and M. L. Liou, "Predictive Motion Vector Field Adaptive Search Technique (PMVFAST)," in *ISO/IEC JTC1/SC29/WG11 MPEG2000*, Noordwijkerhout, NL, March'2000.

[3] R. Li, B. Zeng, and M. L. Liou, "A new three-step search algorithm for block motion estimation," *IEEE Trans. On Circuits and Systems for Video Technology*, vol. 4, no. 4, pp. 438-42, August'94.

[4] Z. L. He and M. L. Liou, "A high performance fast search algorithm for block matching motion estimation," *IEEE Trans. on Circuits and Systems for Video Technology*, vol. 7, no. 5, pp. 826-8, October'97.

[5] A. M. Tourapis, O. C. Au, and M. L. Liou, "Fast Motion Estimation using Circular Zonal Search", *Proc. of SPIE Sym. Of Visual Comm. & Image Processin*, vol. 2, pp. 1496-1504, Jan. 25-27, '99.

[6] A. M. Tourapis, O. C. Au, M. L. Liou, G. Shen, and I. Ahmad, "Optimizing the Mpeg-4 Encoder—Advanced Diamond Zonal Search", in *Proc. of 2000 IEEE Inter. Sym. on Circuits and Systems*, Geneva, Switzerland, May, 2000.

[7] K. K. Ma and P. I. Hosur, "Performance Report of Motion Vector Field Adaptive Search Technique (MVFAST)," in *ISO/IEC JTC1/SC29/WG11 MPEG99/m5851*, Noordwijkerhout, NL, March'00.

[8] A. M. Tourapis, O. C. Au, and M. L. Liou, "Fast Block-Matching Motion Estimation using Predictive Motion Vector Field Adaptive Search Technique (PMVFAST)," in *ISO/IEC/JTC1/SC29/WG11 MPEG2000/M5866*, Noordwijkerhout, NL, March'00.

[9] Implementation Study Group, "Experimental conditions for evaluating encoder motion estimation algorithms," in *ISO/IEC JTC1/SC29/WG11 MPEG99/n3141*, Hawaii, USA, December'99.

[10] "MPEG-4 Optimization Model Version 1.0", in *ISO/IEC JTC1/SC29/WG11 MPEG2000/N3324*, Noordwijkerhout, NL, March'00.

[11] T. Koga, K. Iinuma, A. Hirano, Y. Iijima, and T. Ishiguro, "Motion compensated interframe coding for video conferencing," *Proc. Nat. Telecommun. Conf.*, New Orleans, La., pp. G5.3.1-G5.3.5, December'81.

[12] J. R. Jain and A. K. Jain, "Displacement measurement and its application in interframe image coding," *IEEE Trans. On Communications*, vol. COM-29, pp. 1799-808, December'81.

[13] JVT reference software JM9.2 for JVT/H.264 FRext.

The invention claimed is:

1. A method of selecting, for each of a series of blocks of pixels in a first image accessible from at least one computer device, a respective similar block of pixels in a second image, the method comprising:

for a block of pixels of said series of blocks in the first image, determining a respective value of a cost function for each of a plurality of candidate locations in the second image, the determining the respective value comprising:

determining a similarity measure between the current block of pixels in the first image and a candidate block of pixels at a candidate locations of the plurality of candidate locations in the second image; and determining a function of a candidate motion vector corresponding to the candidate location, a predicted motion vector associated with the current block, and a future predicted motion vector of at least one block of the first image which is later in the series of blocks in the first image than the current block; and selecting a block of pixels at the candidate location as the respective similar block of pixels in the second image including comparing the plurality of candidate locations in the second image based on the respective value of the cost function for each of the plurality of candidate locations in the second image.

2. The method of claim 1, wherein the determining the respective value of the cost functions includes determining for the function a first term representing a number of bits that encode the candidate motion vector and determining a second term representing a number of bits that encode the future predicted motion vector in response to the candidate block of pixels at the candidate location being selected as the respective similar block of pixels in the second image.

3. A method of selecting, for each of a series of blocks of pixels in a first image in a raster scanning order, a respective similar block of pixels in a second image, the method comprising:

for a current block having a location in the first image, employing at least one processor of at least one computer device to facilitate operations, including:

defining a current predicted motion vector for the current block;

defining a search region in the second image as a plurality of candidate locations in the second image, each candidate location of the plurality of candidate locations being associated with a respective candidate motion vector based on a relative displacement between each candidate location of the plurality of candidate locations in the second image and the locations of the current block in the first image;

for each respective candidate motion vector for a corresponding candidate locations of the plurality of candidate locations and for at least one future block in the first image which is later in the series of blocks than the current block:

defining a future predicted-motion-vector for the at least one future block; and calculating a cost function including calculating a similarity measure between the current block in the first image and a block at the corresponding candidate location in the second image, and calculating a function of the respective candidate motion vector the current predicted motion vector, and the further predicted motion vector; and selecting the respective similar block of pixels in the second image corresponding to a candidate location of the plurality of candidate locations having a lowest calculated cost function.

4. The method of claim 3, wherein the calculating the cost function includes determining for the function, a first term representing a number of bits to encode the respective candidate motion vector and determining a second term representing a number of bits to encode an actual motion vector for a next block in response to the block at the corresponding candidate location being selected as the respective similar block of pixels.

5. The method of claim 4, wherein the determining the second term includes determining a number of bits to encode a difference between the respective candidate motion vector and the future predicted motion vector.

6. The method of claim 4, wherein the determining for the function includes determining a weighted sum of the first term and the second term according to a value of a weight parameter.

7. The method of claim 6, further comprising deriving the weight parameter.

8. The method of claim 3, wherein the defining the current predicted motion vector includes defining the current predicted motion vector based on a first motion vector of at least one block of the series of blocks in the first image for which a similar block of the second image has previously been derived and wherein the at least one block spatially neighbors the current block.

9. The method of claim 3, wherein the defining the current predicted motion vector includes defining the current predicted motion vector based on a second motion vector of at least one block in the first frame other than the first image wherein the at least one block is collocated with the current block.

10. The method of claim 3, wherein the defining the current predicted motion vector includes defining the current predicted motion vector based on a third motion vector of at least one block in the second frame other than a frame of the first image and wherein the at least one block spatially neighbors the current block.

11. The method of claim 3, wherein the defining the future predicted motion vector for the at least one future block includes defining the future predicted motion vector for the next block in the series of blocks of pixels in a first image according to the raster scanning order as a median of the respective candidate motion vector, a top-right motion vector and a top-right motion vector.

12. The method of claim 11, further comprising:

in response to calculating that the value of the cost function of a first respective candidate motion vector is less than a first threshold, ceasing the calculating of the cost function for at least one respective candidate motion vector, and generating a set of at least one second candidate motion vector having a predefined spatial relationship to the first respective candidate motion vector, and calculating the cost function for each of the at least one second candidate motion vector prior to the selecting the respective similar block of pixels.

13. The method of claim 12, further comprising:

Selecting the set of the at least one second candidate motion vector as closer to the current predicted-motion-vector than the first respective candidate motion vector based on a measure of distance between pairs of vectors defined based on a number of bits that encode a different between the pairs of vectors.

14. The method of claim 3, wherein the defining the search region in the second image as the plurality of candidate locations in the second image includes defining a candidate location, of the plurality of candidate locations in the second image, associated with the at least one future block relative to the current block in the first image according to the raster scanning order.

15. The method of claim 3, further comprising:
selecting at least one respective candidate motion vector from a set of possible respective candidate emotion vectors using a criterion based on maximizing a distance between at least one respective candidate motion vector and the current predicted motion vector.

16. The method of claim 3, wherein the defining the search region includes defining the search region in a plurality of second images, where the plurality of candidate locations include at least one candidate location in each of the plurality of second images.

17. The method of claim 3, further comprising:
encoding sub-blocks according t a coding order defined by a coding number, where each of a series of blocks are sub-blocks of a larger region of the first image.

18. A system for selecting a respective similar block of pixels in a second image for each of a series of blocks of pixels in a first image, the system comprising:
a processor arranged to process each of the series of blocks in the first image sequentially, and for a current one of the series of blocks in the first image, to select between a plurality of candidate locations in the second image according to a cost function based on:
a similarity measure between the current one in the first image and a block of pixels at a candidate location of the plurality of candidate locations in the second image, and
a function of a candidate motion vector corresponding to the candidate location, a predicted motion vector associated with the current one, and a future predicted motion vector of at least one block of the first image which is later in the series of blocks of pixels in the first image than the current one.

19. A computer program product, embodied upon a non-transitory computer readable medium, and readable by a computer system and which causes the computer system to select, for each of a series of blocks of pixels in a first image, a respective similar block of pixels in a second image by, for a current one of said series of blocks in the first image, selecting between a plurality of candidate locations in the second image according to a cost function based on:
a similarity measure between the current one of said series of blocks of pixels in the first image and a block of pixels at a candidate location of the plurality of candidate locations in the second image, and
a function of a candidate motion-vector corresponding to the candidate location, a predicted motion vector associated with the current one, and a future predicted motion vector of at least one block of the first image which is later in the series of blocks of pixels in the first image than the current one.

20. A method of selecting, for each of a series of blocks of pixels in a first image in a raster scanning order, a respective similar block of pixels in a second image, the method comprising:
for a current one of said blocks of the first image selecting, by at least one computing device including at least one processor, among a plurality of candidate locations in the second image according to respective values of a cost function for each candidate location of the plurality of candidate locations having an associated candidate vector, wherein at least one associated candidate vector is a predicted motion vector for a future block in the first image according to the raster scanning order.

21. A method of selecting, for each of a series of blocks of pixels in a place first image, a respective similar block of pixels in a second image, the method comprising:

for a current one of the series of blocks in the first image, selecting, by a computing device, among a plurality of candidate locations in the second image according to respective values of a cost function for each candidate location of the plurality of candidate locations having an associated candidate vector, wherein the selecting includes selecting a vector from a set of possible candidate vectors using a criterion based on maximizing a distance between the vector and a current predicted motion vector for the current one of the series of block.

22. A method of selecting, for each of a series of blocks of pixels in a first image, a respective similar block of pixels in a second image, the method comprising:
for a current one of the series of blocks in the first image selecting, as facilitated by at least one processor of a computing device, among a plurality of candidate locations in the second image according to respective values of a cost function for each candidate location of the plurality of candidate locations; and
choosing a set of second candidate motion vectors, including:
defining a current predicted motion vector for said current one of the series of blocks; and
defining a first candidate motion vector, and defining a set of second candidate motion vectors which are closer to the current predicted motion vector than the first candidate motion vector, where a measure of distance between pairs of vectors is defined based on a number of bits used to encode a difference between the pairs of vectors.

23. A method of selecting, for each of a series of blocks of pixels in a first image, a respective similar block of pixels in a second image, the method comprising:
for a current one of said series of blocks in the first image selecting, via at least one processor of a computing device, among a plurality of candidate locations in the second image, said plurality of candidate locations comprising a set of candidate locations defined by two location values in respective traverse directions, wherein at least one of the location values for at least one of the respective traverse directions is a non-uniform value.

24. The method of claim 23, wherein the selecting among the plurality of candidate locations in the second image includes selecting among the set of candidate locations in which each of the set of candidate locations are associated with respective motion vectors, which differ from a predicted motion vector for the current one of said series of blocks by the two location values in the respective traverse directions.

25. The method of claim 23, wherein the selecting among the plurality of candidate locations in the second image includes selecting among the set of candidate locations in which each of the set of candidate locations as associated with respective motion vectors, which differ from a (0,0) motion vector by the two location values in the respective traverse directions.

26. The method of claim 23, wherein the selecting among the plurality of candidate locations in the second image includes defining the non-uniform value by a mapping function such that the non-uniform value cannot be expressed by Lm, where m is an integer and L is a constant.

27. The method of claim 23, wherein the selecting among the plurality of candidate locations in the second image includes storing the non-uniform value for subsequent reference.

28. A method of selecting, for each of a series of blocks of pixels in a first image, a respective similar blocks of pixels in a second image, the method comprising:

for a current one of said series of blocks in the first image, selecting, by at least one computing device including at least one processor, among a plurality of candidate locations in the second image, said plurality of candidate locations comprising a set of candidate locations defined by two locations values, wherein at least one of the two location values is expressible as a non-uniform location value.

29. The method of claim 28, wherein the selecting among the plurality of candidate locations in the second image includes selecting among the set of candidate locations in which each of the set of candidate locations are associated with respective motion vectors, which differ from a predicted motion vector for the current one of said series of blocks by the two location values.

30. The method of claim 28, wherein the selecting among the plurality of candidate locations in the second image includes calculating the non-uniform location value according to a mapping function of $DA_m m/n = -\ldots, 2, -1, 0, 1, 2, \ldots$, n is 1 or a power of two, D is a constant, and $A_m$ is a value which is less than 1 for at least one value of m and which for all values of m is in the range 0.75 to 1.0.

31. The method of claim 30, wherein the selecting among the plurality of candidate locations in the second image includes selecting among the set of candidate locations in which each of the set of candidate locations are associated with respective motion vectors which differ from a (0,0) motion vector by the two locations values.

32. The method of claim 30, further comprising:
defining the value of $A_m$ for all values of m to be at least 0.85.

33. The method of claim 30, further comprising:
defining the value of $A_m$ to be equal to 1 for $m<-1$ and $m>1$.

34. The method of claim 28, wherein the selecting among the plurality of candidate locations in the second image includes storing non-uniform location value for subsequent reference.

35. The method of claim 28, wherein the non-uniform location value cannot be expressed by Lm, where m is an integer and L is a constant.

36. A system for selecting, for each of a series of blocks of pixels in a first image, a respective similar block of pixels in a second image, the system comprising:
a processor arranged, for a current one of said series of blocks in the first image, to select among a plurality of candidate locations in the second image, said plurality of candidate locations comprising a set of candidate locations defined by two location values in respective traverse directions, wherein at least one of the location values for at least one of the respective traverse directions is non-uniform as defined by a mapping function.

37. The system of claim 36, wherein the non-uniform at least one of the location values cannot be expressed by Lm, where m is an integer and L is a constant.

38. A computer program product, embodied upon a non-transitory computer readable medium, and readable by a computer system and which causes the computer system to:
select, for each of a series of blocks of pixels in a first image, a respective similar block of pixels in a second image by, for a current one of said series of blocks in the first image, selecting among a plurality of candidate locations in the second image, said plurality of candidate locations comprising a set of candidate locations defined by two location values in respective traverse directions, wherein at least one of the location values for at least one of the respective traverse directions is expressible as a non-uniform location value.

\* \* \* \* \*